No. 623,617. Patented Apr. 25, 1899.
J. J. O'CROWLEY.
PUMP.
(Application filed July 22, 1898.)
(No Model.)
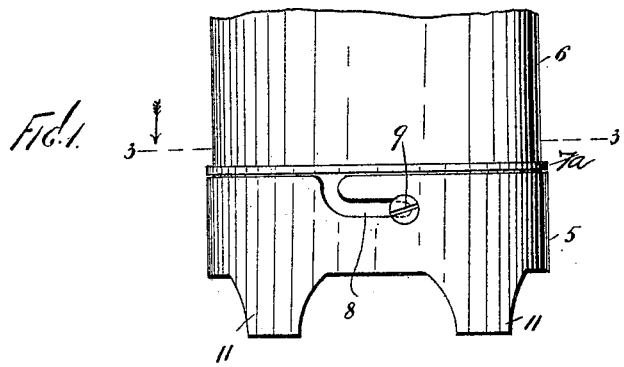
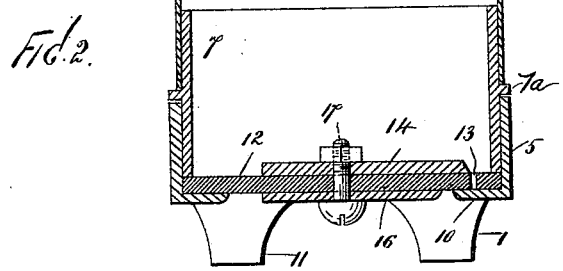
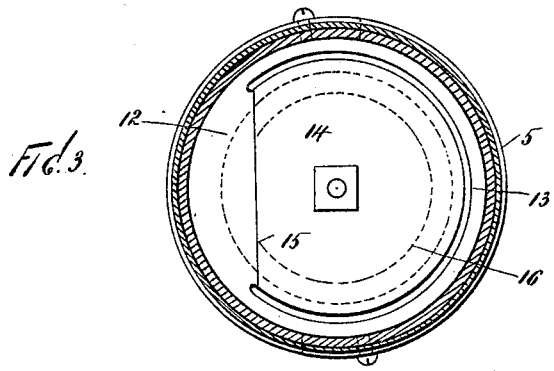
WITNESSES
John Buckler
F. A. Stewart
INVENTOR
James J. O'Crowley
BY
Edgar Tale & Co.
ATTORNEYS.
THE NORRIS PETERS CO., PHOTO-LITHO., WASHINGTON, D. C.

UNITED STATES PATENT OFFICE.

JAMES J. O'CROWLEY, OF JERSEY CITY, NEW JERSEY.

PUMP.

SPECIFICATION forming part of Letters Patent No. 623,617, dated April 25, 1899.

Application filed July 22, 1898. Serial No. 686,582. (No model.)

*To all whom it may concern:*

Be it known that I, JAMES J. O'CROWLEY, a citizen of the United States, residing at Jersey City, in the county of Hudson and State of New Jersey, have invented certain new and useful Improvements in Pumps, of which the following is a full and complete specification, such as will enable those skilled in the art to which it appertains to make and use the same.

This invention relates to pumps, and particularly to devices of this class which are employed on canal-boats for removing water therefrom; and the object of the invention is to provide an improved device of this class which is simple in construction and operation and which is so constructed that it may be quickly and easily repaired or provided with a new valve whenever desired.

The invention is fully disclosed in the following specification, of which the accompanying drawings form a part, in which—

Figure 1 is a side view of the lower part of a pump of the class specified; Fig. 2, a central vertical section thereof, and Fig. 3 a transverse section on the line 3 3 of Fig. 1.

In the drawings forming part of this specification the separate parts of my improvement are designated by the same numerals of reference in each of the views, and in said drawings I have shown at 5 the bottom cylindrical casing of a pump of the class referred to, and at 6 the pump-tube, and the pump-tube is connected with the casing 5 by a supplemental cylindrical casing 7, which is soldered to or otherwise permanently connected with the tube 6 in any desired manner and is provided with an annular exterior flange 7ª, upon which the tube 6 rests, and the tube 6 is detachably connected with the casing 5 by means of a bayonet-joint, as shown in Fig. 1, said bayonet-joint consisting of the usual angular slot 8, formed in said casing, and a pin, screw, or similar device 9, connected with the lower part of the cylindrical casing 7.

The casing 5 is provided at its lower end with an inwardly-directed annular flange 10, and said casing is supported by legs 11, and by means of the annular flange 10 a central circular opening is formed in the bottom of the casing 5. I also provide a pump-valve, which consists of a disk 12, of soft rubber, rubber and canvas, or similar material, and the diameter of which is equal to the inner diameter of the casing 5, and said disk is held in place by the lower end of the cylindrical coupling-casing 7.

The valve-disk 12 is provided with a circular slot or opening 13, which extends about three-quarters of the way around said disk and is located at a predetermined distance from the outer edge thereof, and secured to the upper side of said valve-disk 12 is a metal plate 14, which is circular in form, except at one side, where it is cut away, as shown at 15, and the greater diameter of the plate 14 is equal to the greater diameter of the central portion of the valve-disk 12 formed by the slot 13, and the greater diameter of the said central portion of the valve-disk 12 formed by the slot 13 is greater than the diameter of the central opening in the bottom of the casing 5 formed by the inwardly-directed flange 12, and when thus constructed the central body portion of the valve-disk 12, at the perimeter thereof, rests upon the inner edge of the flange 10, as clearly shown in Fig. 2, and the circular portion of the plate 14, or the perimeter thereof, is also supported by said flange.

Secured to the bottom of the central circular portion of the valve-disk 12 is another plate 16, which is also circular in form except at one side thereof, where it is cut away on the line 15, and the perimeter of this plate 16 is indicated in Fig. 3 by the inner dotted line, the outer dotted line indicating the inner edge of the flange 10, and the greatest diameter of the body portion of the plate 16 is less than that of the central opening in the bottom of the casing 5 formed by said flange 10.

The central circular portion of the valve-disk 12, which is separated except at one side from said disk by the slot 13, constitutes the valve proper, and the plates 14 and 16 are connected therewith for the purpose of weighting the same and to hold it in proper form so as to facilitate the operation thereof.

The lower end of the coupling-casing 7 fits within the casing 5 and rests on the perimeter of the valve-disk, as described, and the plates 14 and 16 are secured to the central body portion of the valve-disk by means of a bolt 17.

The operation of this pump is the same as that of all other pumps of this class, the piston or pumping mechanism being located in the upper portion of the pump-tube 6, and by means of the construction herein shown and described the pump-tube may be quickly and easily removed from the casing 5 whenever desired and the old valve removed and a new valve dropped into position.

My improvement is simple in construction and operation and perfectly adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. A pump of the class described, comprising a bottom casing provided with an annular interior flange, a valve adapted to be placed upon said flange, a pump-tube, and a supplemental reinforcing-casing fitting within and suitably secured to said pump-tube and adapted to be detachably fitted within said bottom casing and to rest upon said valve to hold the same in place said supplemental reinforcing-casing being formed of thicker material than said pump-tube, substantially as shown and described.

2. A pump of the class described, comprising a bottom casing provided with an annular interior flange, a valve adapted to be placed upon said flange, a pump-tube, and a supplemental reinforcing-casing fitting within and detachably secured to said pump-tube, and provided with an annular exterior flange upon which said pump-tube rests, and adapted to be detachably fitted within said bottom casing and to rest upon said valve to hold the same in place said supplemental reinforcing-casing being formed of thicker material than said pump-tube, substantially as shown and described.

In testimony that I claim the foregoing as my invention I have signed my name, in presence of the subscribing witnesses, this 21st day of July, 1898.

JAMES J. O'CROWLEY.

Witnesses:
F. A. STEWART,
A. C. McLOUGHLIN.